(12) United States Patent
Hsiao (10) Patent No.: US 7,443,675 B2
(45) Date of Patent: Oct. 28, 2008

(54) HEAT PIPE WITH GUIDED INTERNAL GROOVES AND HEAT DISSIPATION MODULE INCORPORATING THE SAME

(75) Inventor: Wei Chung Hsiao, Taipei (TW)

(73) Assignee: Mitac Technology Corp., Hsin-Chu Hsien (TW)

( * ) Notice: Subject to any disclaimer, the term of this patent is extended or adjusted under 35 U.S.C. 154(b) by 98 days.

(21) Appl. No.: 11/488,761

(22) Filed: Jul. 19, 2006

(65) Prior Publication Data

US 2007/0177354 A1    Aug. 2, 2007

(30) Foreign Application Priority Data

Jan. 27, 2006    (TW)    .............. 95103446 A (51) Int. Cl.
*H05K 7/20*    (2006.01)
*H01L 23/36*    (2006.01)

(52) U.S. Cl. ............... 361/700; 361/701; 165/80.4; 165/80.5; 165/121; 165/126

(58) Field of Classification Search .......... 361/699, 361/700, 701, 702, 707–710; 165/80.4, 80.5, 165/133, 272, 104.26, 104.33; 174/15.2; 257/714, 715; 29/890.032
See application file for complete search history.

(56) References Cited

U.S. PATENT DOCUMENTS

| | | | | |
|---|---|---|---|---|
| 3,402,767 A | * | 9/1968 | Bohdansky et al. | .... 165/104.26 |
| 3,528,494 A | * | 9/1970 | Levedahl | ............... 165/104.26 |
| 4,116,266 A | * | 9/1978 | Sawata et al. | .......... 165/104.26 |
| 4,489,777 A | * | 12/1984 | Del Bagno et al. | ..... 165/104.26 |
| 4,541,261 A | * | 9/1985 | Yanadori et al. | .............. 72/112 |
| 5,309,986 A | * | 5/1994 | Itoh | ...................... 165/104.26 |
| 6,056,044 A | * | 5/2000 | Benson et al. | ......... 165/104.26 |
| 6,508,302 B2 | * | 1/2003 | Ishida et al. | ........... 165/104.26 |
| 6,827,134 B1 | * | 12/2004 | Rightley et al. | ........ 165/104.26 |
| 6,942,016 B2 | * | 9/2005 | Kobayashi et al. | ............ 165/47 |
| 7,258,160 B2 | * | 8/2007 | Hashimoto | ............. 165/104.26 |
| 2005/0252640 A1 | | 11/2005 | Chang | |
| 2007/0056714 A1 | * | 3/2007 | Wong | .................... 165/104.26 |

FOREIGN PATENT DOCUMENTS

JP    05087475 A    *    4/1993

\* cited by examiner

*Primary Examiner*—Michael V Datskovskiy
(74) *Attorney, Agent, or Firm*—Rosenberg, Klein & Lee (57) ABSTRACT

A heat pipe includes a heat receiving section, a heat transfer section, and a heat dissipation section. A groove structure is formed inside the heat pipe and extends from the heat receiving section to the heat dissipation section. The groove structure includes at least an axially-extending parallel portion and a non-axially-extending parallel portion. The axially-extending parallel portion includes a plurality of internal groove segments extending parallel in an axial direction of the heat pipe and the non-axially-extending parallel portion includes a plurality of groove segments extending from the axially-extending parallel groove segments in a parallel manner in a direction different from the axial direction.

11 Claims, 11 Drawing Sheets

HEAT PIPE WITH GUIDED INTERNAL GROOVES AND HEAT DISSIPATION MODULE INCORPORATING THE SAME

FIELD OF THE INVENTION

The present invention relates to a heat pipe structure, and in particular to a performance-improved heat pipe which comprises guided internal grooves each composed of an axially-extending section and a non-axially-extending section to realize enhanced and uniform phase change of a working fluid of the heat pipe so as to improve the performance of heat dissipation. The present invention also relates to a heat dissipation module that incorporates the heat pipe having guided internal grooves to enhance performance of heat dissipation thereof.

BACKGROUND OF THE INVENTION

Integrated circuits (ICs) have been widely used in a variety of applications, such as industrial equipments, measuring equipments, and computer facility. The operation of the ICs generates a great amount of heat and the heat must be timely removed otherwise ICs cannot operate properly if the temperature rises to exceed temperature limitation thereof.

Thus, the IC devices must be combined with a heat dissipation device in order to properly dissipate the heat generated by the ICs and thus maintaining proper working temperature thereof. This is particularly true for a central processing unit (CPU), which is the core of the operation of a computer system, and maintaining proper temperature is even more severe.

With the increase of operation speed of the central processing unit and the ICs, improvement of the performance of the heat dissipation device that removes heat from the central processing unit or ICs is continuously required. This makes the conventional heat dissipation devices, which is comprised of fins and plates, is inefficient for the up-to-date ICs. Fans and heat pipes are commonly combined with fins and plates to enhance heat removal performance of the heat dissipation devices.

As compared to desktop computers, notebook computers or tablet computers often have a very compact size and construction and thus a very limited internal space for arrangement of the heat dissipation devices. This makes it even more difficult to properly remove heat from the notebook computers or tablet computers.

Figure 1:
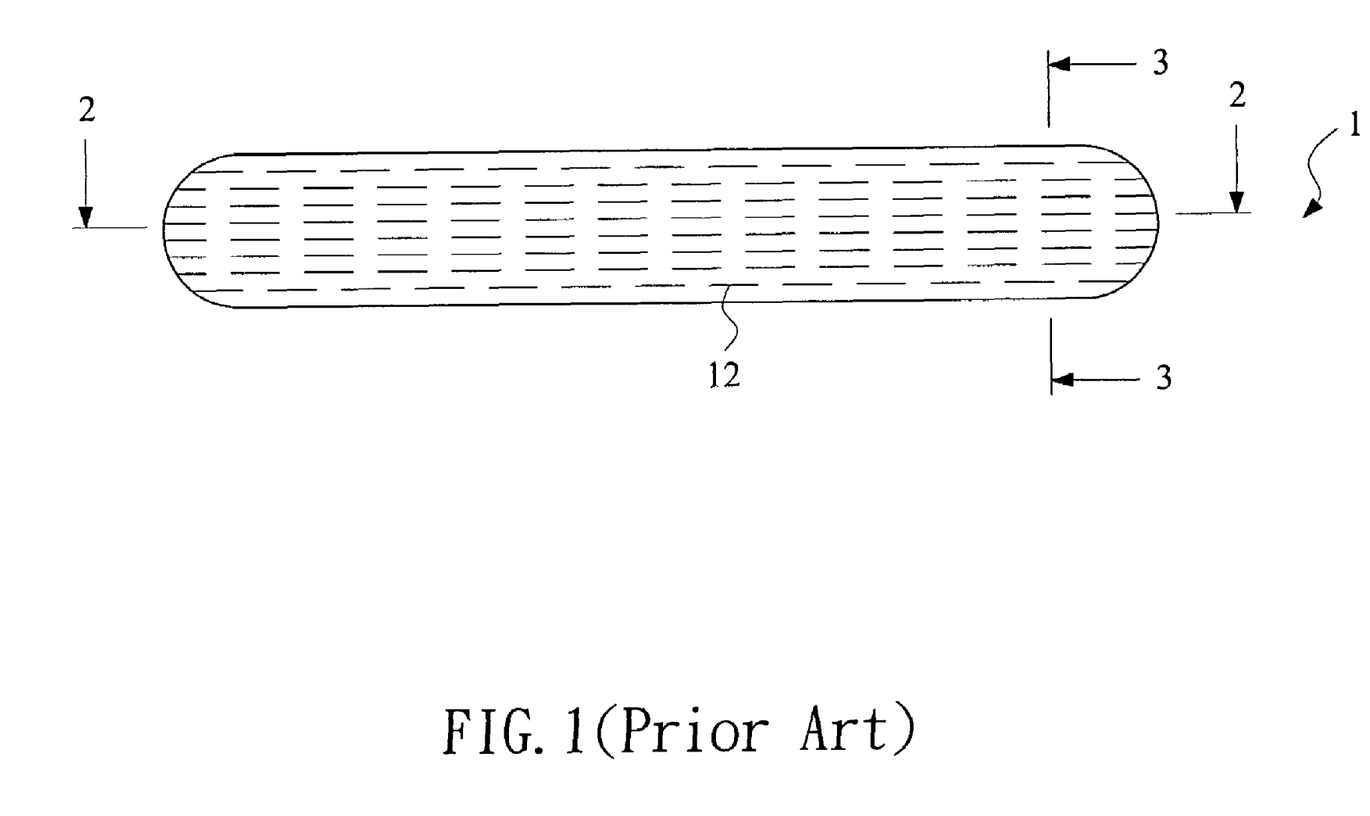
FIG. 1 is a schematic side elevational view of a conventional heat pipe.
Figure 2:
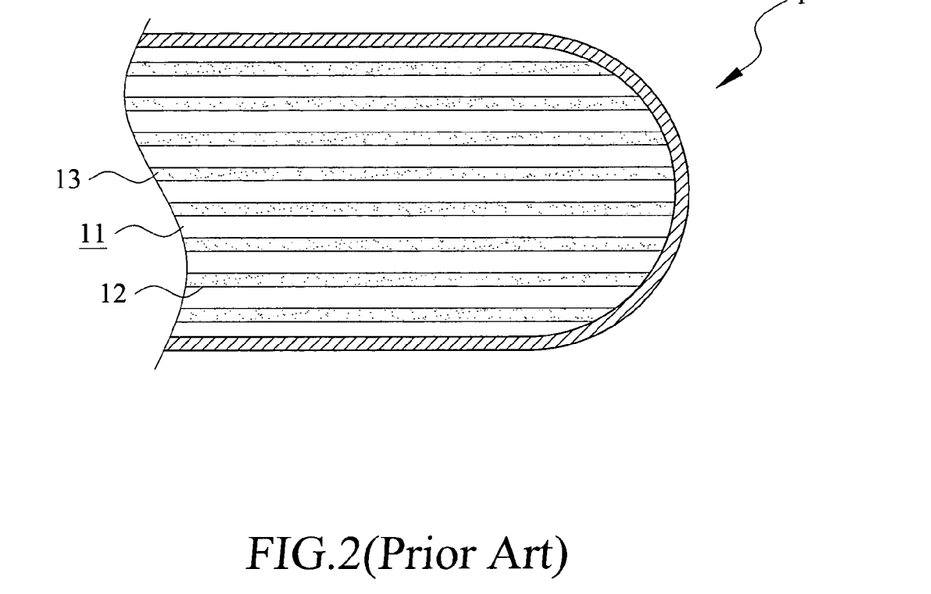
FIG. 2 is a cross-sectional view taken along line 2-2 of FIG. 1.
Figure 3:
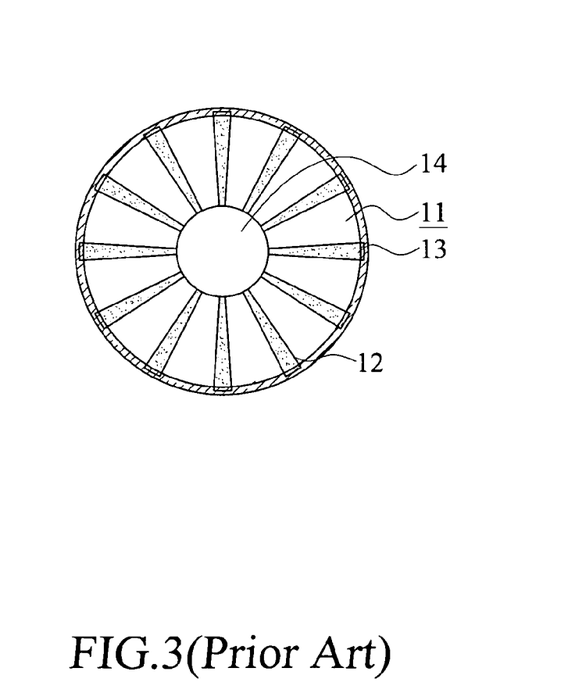
FIG. 3 is a cross-sectional view taken along line 3-3 of FIG. 1.

FIGS. 1-3 of the attached drawings show a conventional structure of a heat pipe, wherein FIG. 1 is an overall structure of the conventional heat pipe, FIG. 2 is a cross-sectional view taken along line 2-2 of FIG. 1, and FIG. 3 is a cross-sectional view taken along line 3-3 of FIG. 1. The conventional heat pipe, which is generally designated with reference numeral 1 in FIGS. 1-3, comprises a casing having an inner wall 11 and a plurality of internal grooves 12 defined in the inner wall 11 for accommodating a working fluid 13. Each internal groove 12 extends in an axial direction of the heat pipe 1 in a substantially parallel manner. A central channel 14 is formed inside the casing and surrounded by the inner wall 11.

Figure 4:
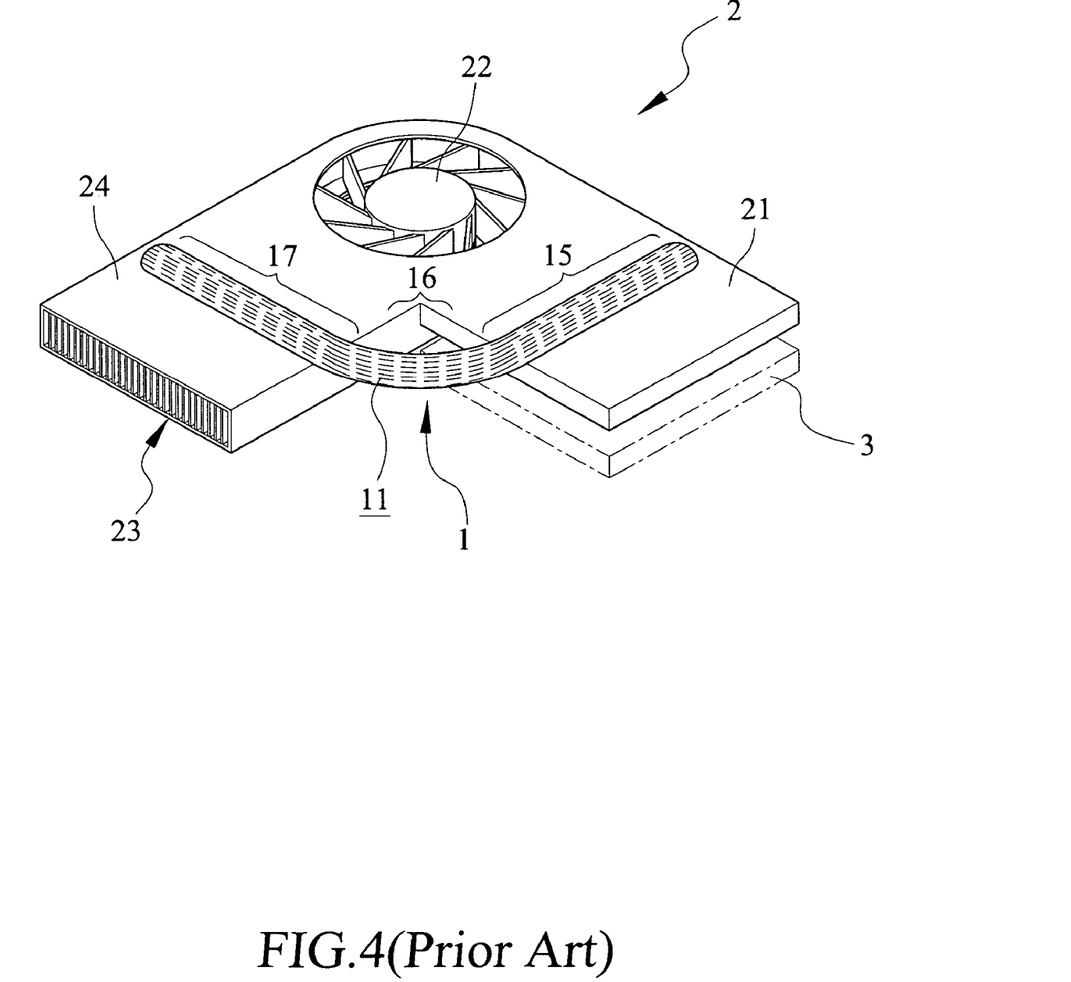
FIG. 4 is a perspective view showing the conventional heat pipe incorporated in a conventional heat dissipation module.
Figure 5:
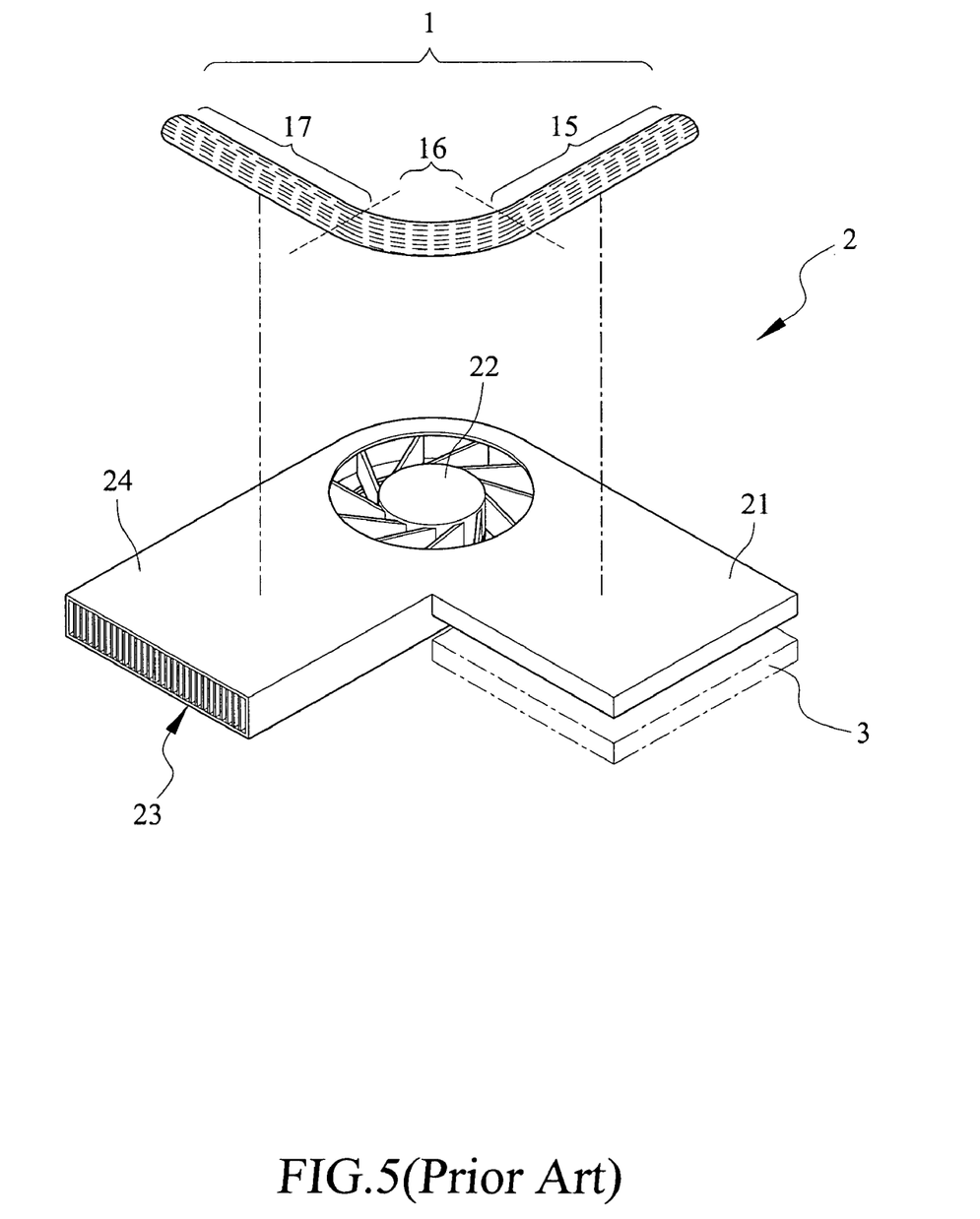
FIG. 5 is a perspective view similar to FIG. 4 but with the heat pipe detached from the heat dissipation module.

Also referring to FIGS. 4 and 5, which show a perspective view and an exploded view, respectively, illustrating a conventional heat dissipation module, generally designated with reference numeral 2, incorporating the conventional heat pipe 1 discussed with reference to FIGS. 1-3. The heat dissipation module 2 is placed in physical contact with a top face of a heat generating device 3, such as a CPU. The heat dissipation module 2 comprises a heat conduction case 21, a fan 22, a fin assembly 23, and a heat dissipation case 24. The heat pipe 1 is attached to the heat dissipation module 2 and straddles between the heat conduction case 21 and the heat dissipation case 24.

In the heat dissipation module 2, the fan is arranged between the heat conduction case 21 and the fin assembly 23. The fin assembly 23 is received and retained inside the heat dissipation case 24 and forms a plurality of airflow passages (not labeled) for airflows caused by the operation of the fan 22. The airflows caused by the fan 22 facilitate heat removal from the fin assembly 23 to dissipate heat generated by the heat generating device 3.

The heat pipe 1, when mounted to the heat dissipation module 2, can be imaginarily divided into three sections, namely a heat receiving section 15, a heat transfer section 16, and a heat dissipation section 17. The heat receiving section 15 is coupled to and is in physical engagement with the portion of the heat conduction case 21 that is in contact with the heat generating device 3 to receive heat therefrom, and the heat dissipation section 17 is coupled to the fin assembly 23 whereby the heat generated by the heat generating device 3 is transmitted through the heat receiving section 15, the heat transfer section 16, and the heat dissipation section 17 to the fin assembly 23, which, with the aid of the airflows caused by the fan 22, effectively dissipates the heat transmitted to the fin assembly 23 into the surroundings.

During heat dissipation, the internal grooves 12 of the heat pipe 1 extending parallel and axially have a short flow path for the working fluid and thus the working fluid 13 that is accommodated in the internal grooves 12 evaporates by absorbing heat at the heat receiving section 15 and the vapor of the working fluid 13 flows along the central channel 14 from the heat receiving section 15, through the heat transfer section 16, to the heat dissipation section 17 where the heat carried by the vapor is released to the fin assembly 23 and the vapor condensed back into liquid forms that flow along the internal grooves 12 back to the heat receiving section 15.

The heat dissipation module incorporating heat pipe is effective in heat removal for notebook computers or tablet computers that have a very limited internal space. However, the performance of the conventional heat pipe can still be further improved.

For example, the internal grooves 12 and the central channel 14 of the conventional heat pipe are all arranged in a manner that they are substantially parallel and extend in an axial direction of the heat pipe. When the heat pipe is heated by heat energy from for example a CPU, the working fluid inside the heat pipe is heated at the heat receiving section and evaporates into a gaseous form to flow along central channel toward the heat dissipation section, where the vapor condenses into liquid form by releasing heat. By means of pressure difference between the heat receiving section and the heat dissipation section, together with capillary induced by surface tension of the liquid form working fluid, the working fluid flows along the internal grooves back to the heat receiving section to receive heat again. A continuous heat receiving and releasing cycle is thus established.

In the conventional heat pipe, although high flow speed of the working fluid can be obtained in the internal grooves, yet uniform heating and cooling of the working fluid in all the internal grooves is very difficult, and the thermal capacity of the working fluid is not fully exploited and thus overall performance is reduced.

Such a drawback of the conventional heat pipe is due to that the internal grooves are substantially uniformly distributed in a circumferential direction, while only a circumferential portion of the heat pipe at the receiving section is in physical engagement with the heat generating device or the heat conduction case of the heat dissipation module. This means that most of the heat from the heat source is absorbed by the working fluid inside the internal grooves that are located close to the heat source, while the amount of heat absorbed by the working fluid inside the internal grooves that are away from the heat source is relatively low. Thus, the working fluid inside the heat pipe is not heated uniformly, leading to poor exploitation of the thermal capacity of the working fluid.

SUMMARY OF THE INVENTION

Thus, an objective of the present invention is to provide a heat pipe having a grooved structure, which makes change to the structure to overcome the drawbacks of the conventional designs.

Another objective of the present invention is to provide a heat pipe, which allows modification to the grooves, including change of dimensions and increase of number, in high thermal energy distributed areas, based on experimental result of temperature and thermal analysis, to further enhance heat dissipation of the heat pipe.

Another objective of the present invention is to provide a heat pipe that comprises a groove structure that is improved over the conventional grooves to enhance heat dissipation of the heat pipe.

A further objective of the present invention is to provide a heat pipe having internal grooves comprising an axially-extending parallel segment and a non-axially-extending parallel segment, which is incorporated with a heat dissipation module to enhance the performance of heat transfer and dissipation of the heat dissipation module.

To realize the above objectives, the present invention provides a heat pipe comprised of a heat receiving section, a heat transfer section, and a heat dissipation section. The heat pipe comprises a plurality of internal grooves formed therein. The internal grooves are of a non-axially-extending parallel structure at the heat receiving section to enhance uniformity of heating for the heat receiving section and the internal grooves are of an axially-extending parallel structure at the heat dissipation section to shorten flow path of the working fluid for reducing the time for the flowing of the working fluid.

In an embodiment of the heat pipe according to the present invention, the heat pipe is attached to a heat dissipation module comprising a heat conduction case and a fin assembly. The heat conduction case and the fin assembly respectively form a heat-receiving-section receiving slot and a heat-dissipation-section receiving slot I which the heat receiving section and the heat dissipation section of the heat pipe are embedded with increased contact area therebetween. Further, a fan is arranged between the heat conduction case and the fin assembly of the heat dissipation module for more efficiently dissipating the heat carried by the working fluid into the surroundings.

Compared with the conventional heat pipe, the heat pipe in accordance with the present invention improves the construction of heat pipe in a local manner whereby the overall size and outside configuration of the heat pipe are not altered. Thus, the drawback of non-uniform heating and dissipation and extended time of flowing for the working fluid of the conventional designs can be easily overcome without extra space used and performance of the heat pipe is significantly enhanced.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE PREFERRED EMBODIMENTS

Figure 6:
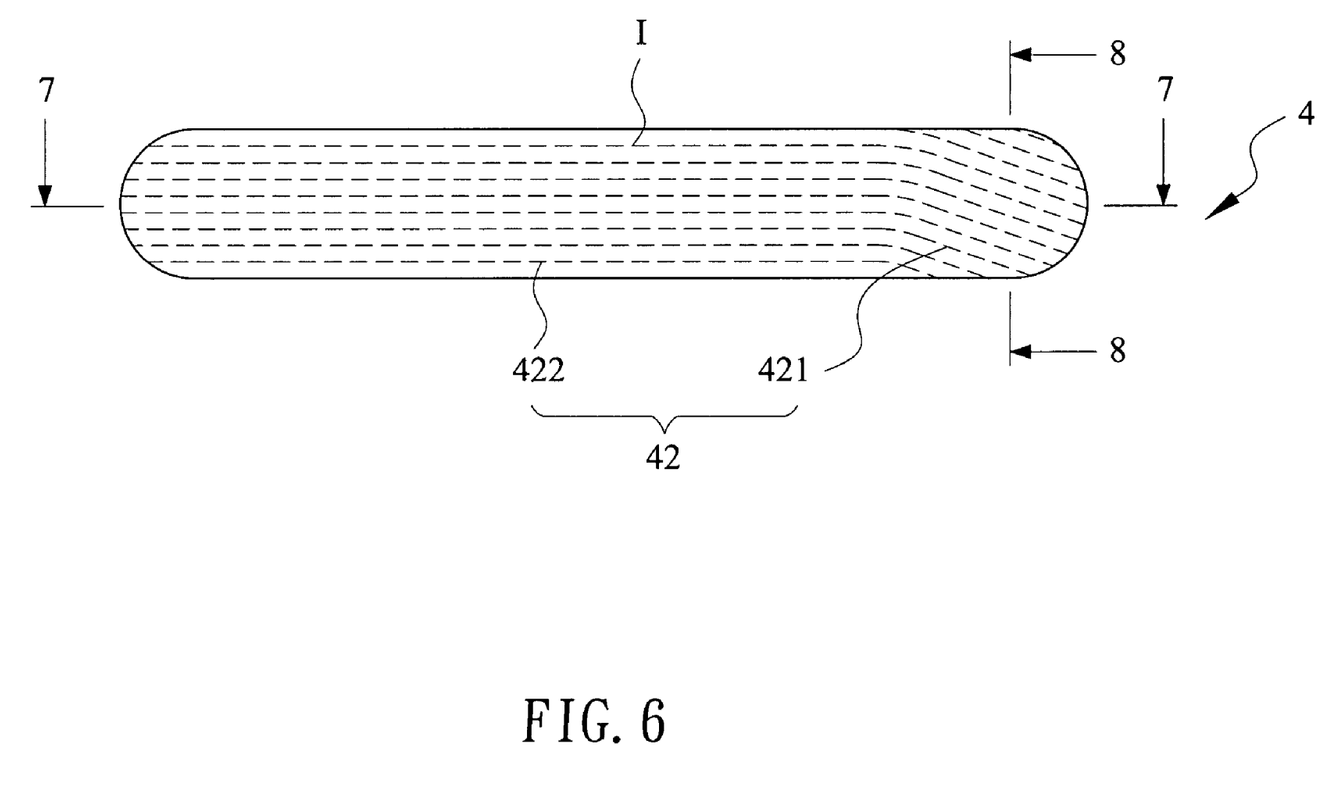
FIG. 6 is a schematic side elevational view of a heat pipe constructed in accordance with the present invention.
Figure 7:
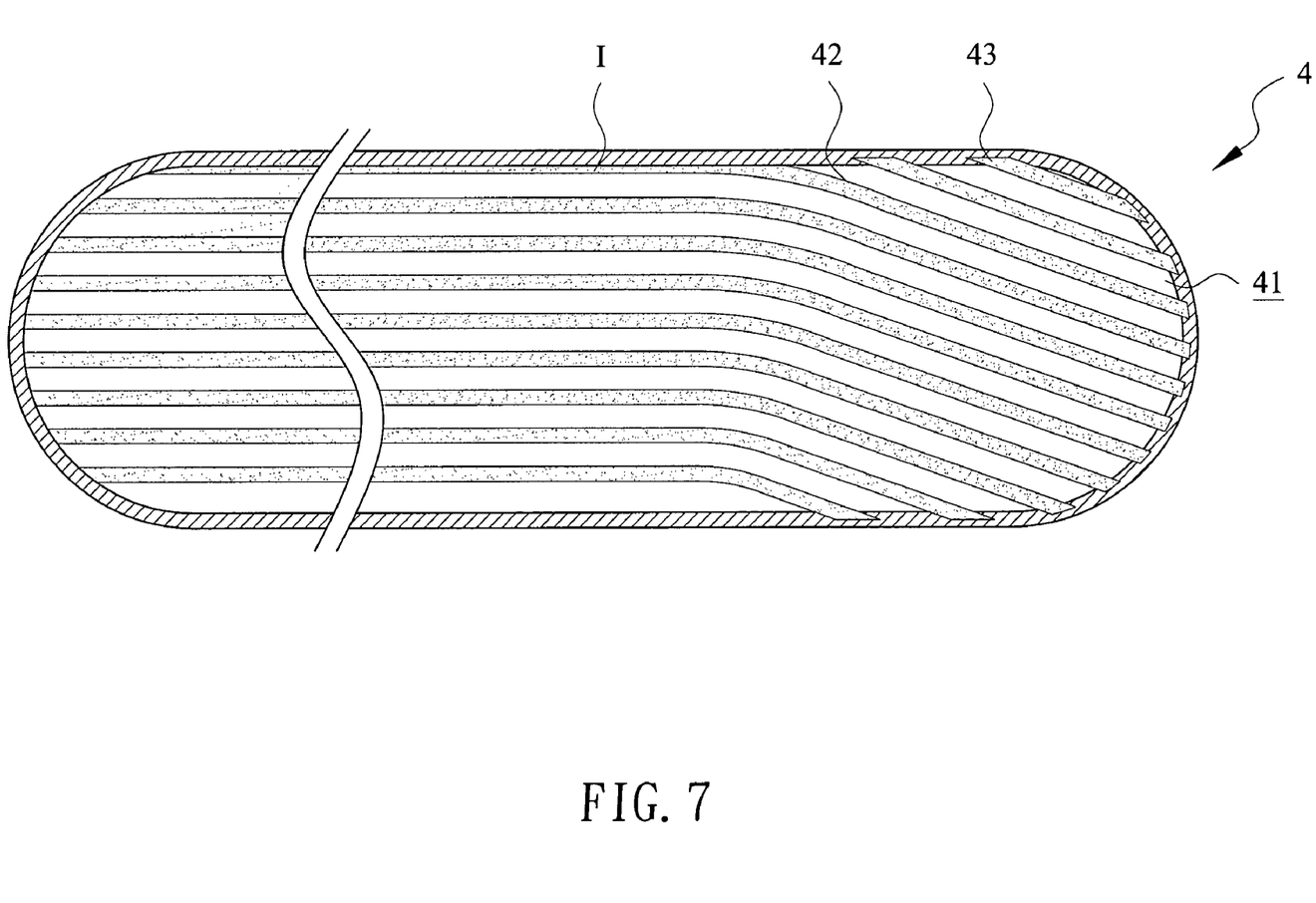
FIG. 7 is a cross-sectional view taken along line 7-7 of FIG. 6.
Figure 8:
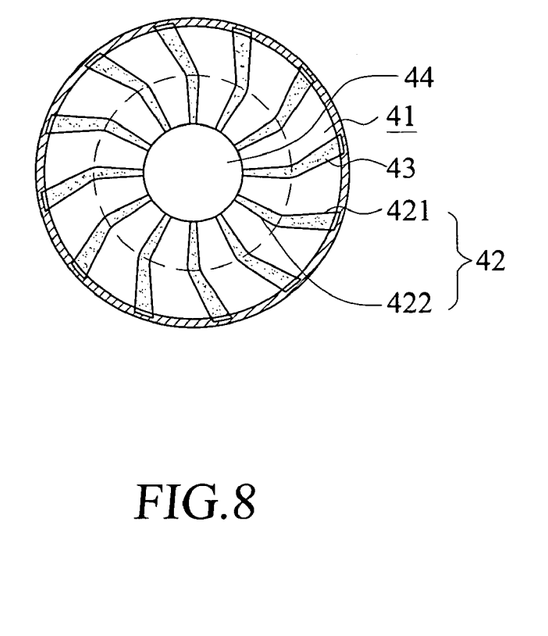
FIG. 8 is a cross-sectional view taken along line 8-8 of FIG. 6.

With reference to the drawings and in particular to FIGS. 6-8, which show, respectively, a schematic view of a heat pipe constructed in accordance with the present invention, and cross-sectional views taken along line 7-7 and 8-8 of FIG. 6, a heat pipe constructed in accordance with the present invention, generally designated with reference numeral 4, comprises an inner wall 41 in which a plurality of internal grooves 42, which are distributed in a circumferential direction, is defined. Each groove 42 has a non-axially-extending parallel segment 421 and an axially-extending parallel segment 422. The axially-extending parallel segment 422 are arranged to extend in an axial direction I of the heat pipe 4 and substantially parallel to each other. The non-axially-extending parallel segment 421 extends from the axially-extending parallel segment 422 in an angle with respect to the axial direction I so as to form a non-axially-extending parallel configuration. All the internal grooves 42 accommodate a working fluid 43. A central channel 44 is formed inside the heat pipe 4 and surrounded by the inner wall 41.

Figure 9:
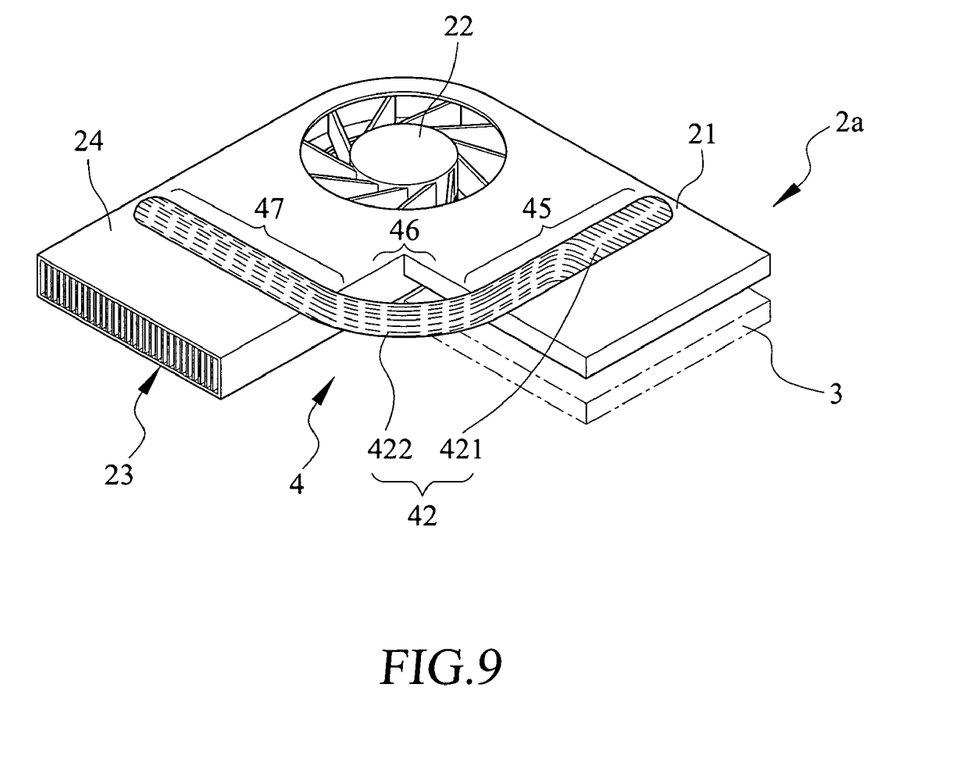
FIG. 9 is a perspective view showing the heat pipe of the present invention incorporated in a heat dissipation module in accordance with the present invention.
Figure 10:
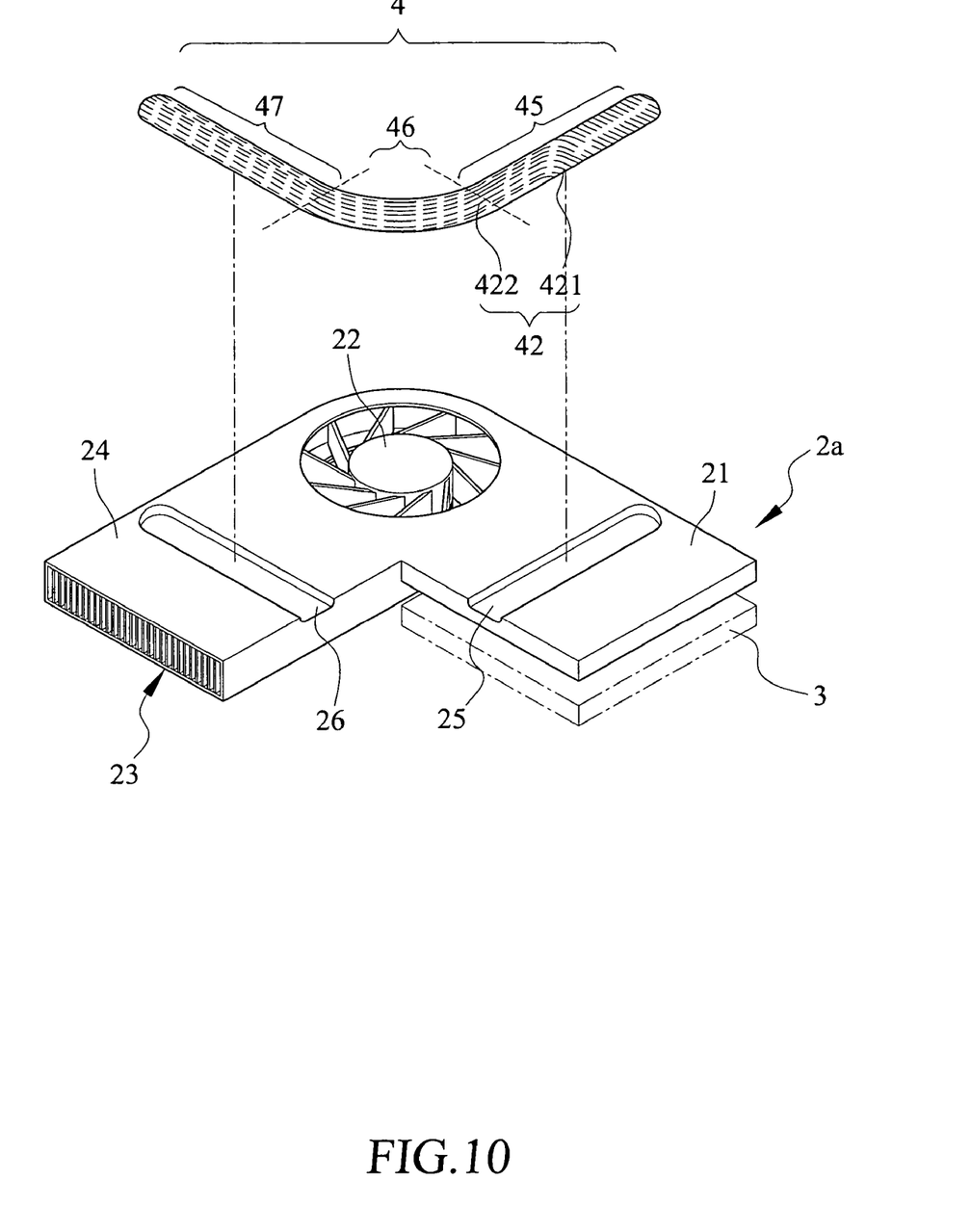
FIG. 10 is similar to FIG. 9 with the heat pipe detached from the heat dissipation module.

Also referring to FIGS. 9 and 10, which show, respectively, a perspective view of a heat dissipation module, generally designated with reference numeral 2a, to which a heat pipe in accordance with the present invention is attached and an exploded view where the heat pipe is detached from the heat dissipation module, when attached to the heat dissipation module 2a, the heat pipe 4 can be imaginarily divided into a heat receiving section 45, a heat transfer section 46, and a heat dissipation section 47. The heat dissipation module 2a comprises a heat conduction case 21 and a heat dissipation case 24, respectively forming a heat-receiving-section receiving slot 25 and a heat-dissipation-section receiving slot 26 for at least partially receiving the heat receiving section 45 and the heat dissipation section 47 of the heat pipe 4.

A major difference between the heat pipe 4 in accordance with the present invention and the conventional heat pipe resides in that the internal grooves 42 of the heat pipe 4 of the present invention is comprised of an non-axially-extending parallel segment 421 located in the heat receiving section 45 and an axially-extending parallel segment 422 located in the heat transfer section 46 and the heat dissipation section 47.

Since the non-axially-extending parallel segment 421 is located in the heat receiving section 45 of the heat pipe 4, in the heat receiving section 45, the working fluid 43 inside the angled, non-axially-extending parallel segments 421 of the internal grooves 42 is subject to uniform heating from a heat generating device 3. The working fluid 43 thus evaporates and turns into gas that flows through the central channel 44 toward the heat dissipation section 47 where heat exchange occurs between the working fluid 43 and the fin assembly 23 through the inner wall 41 of the heat pipe 4 and the heat dissipation case 24. With the heat exchange, the gaseous working fluid 43 condenses and turns back to liquid.

Since the axially-extending parallel segments 422 of the internal grooves 42 are located in the heat transfer section 46 and the heat dissipation section 47 of the heat pipe 4, the axially-extending parallel segments 422 form the shortest flowing path for the working fluid 43 within the heat transfer section 46 and the heat dissipation section 47, which allows the condensed working fluid to flow from the heat dissipation section 47 back to the heat receiving section 45 in the most efficient manner, leading to enhanced efficiency of circulation and heat transfer.

Those having ordinary skill in the art may realize that the dimension of the internal grooves 42, including depth and width of the internal grooves 42, the inclination of the non-axially-extending parallel segment 421, and the distribution of the internal grooves 42 can be varied to suit the different requirement for different applications. The working fluid 43 can be any suitable fluid featuring high thermal conductivity, high flaming point, high liquid surface tension, low corrosiveness, low chemical activity, and low viscosity.

Figure 11:
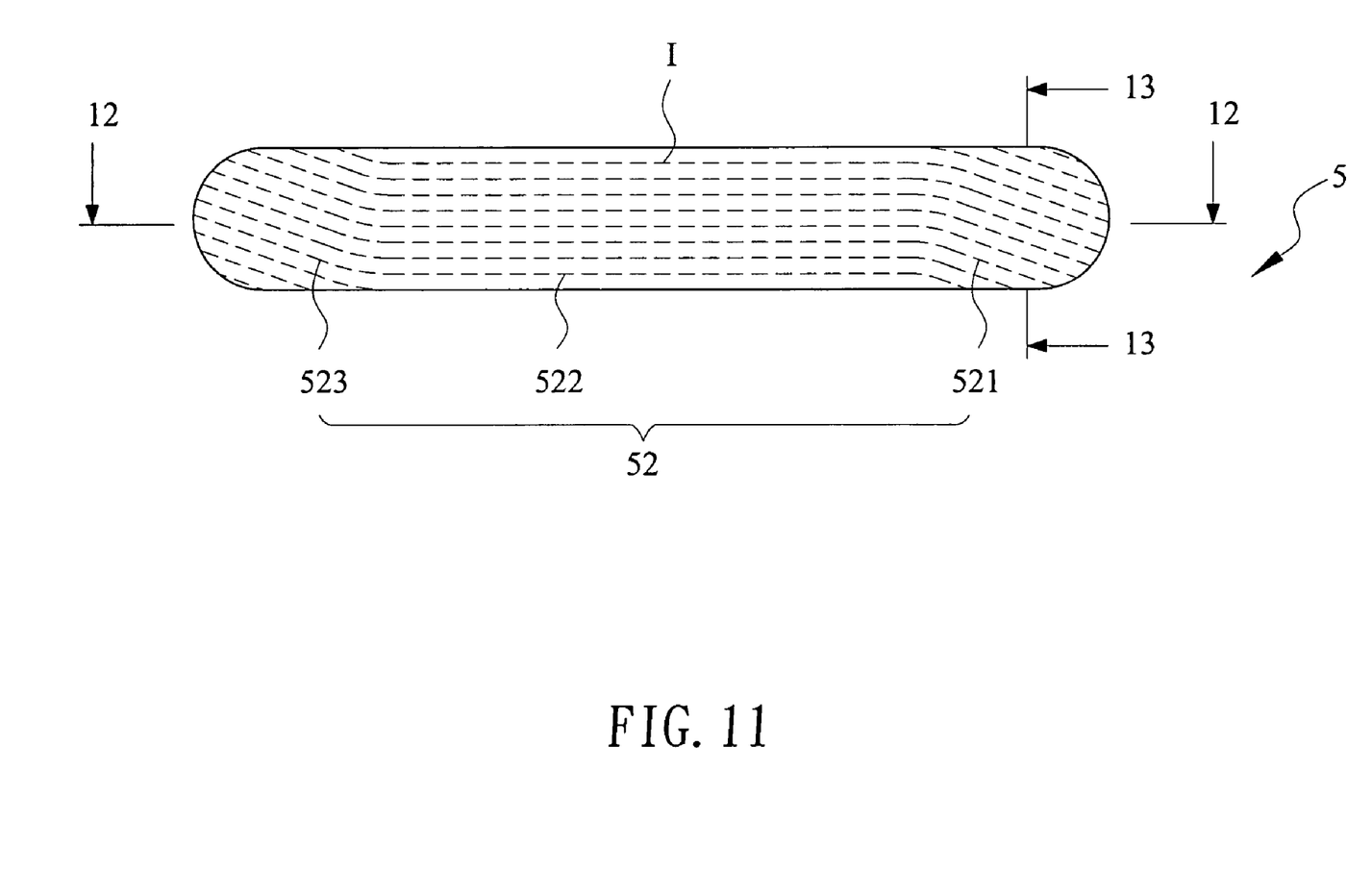
FIG. 11 is a schematic side elevational view of a heat pipe constructed in accordance with another embodiment of the present invention.
Figure 12:
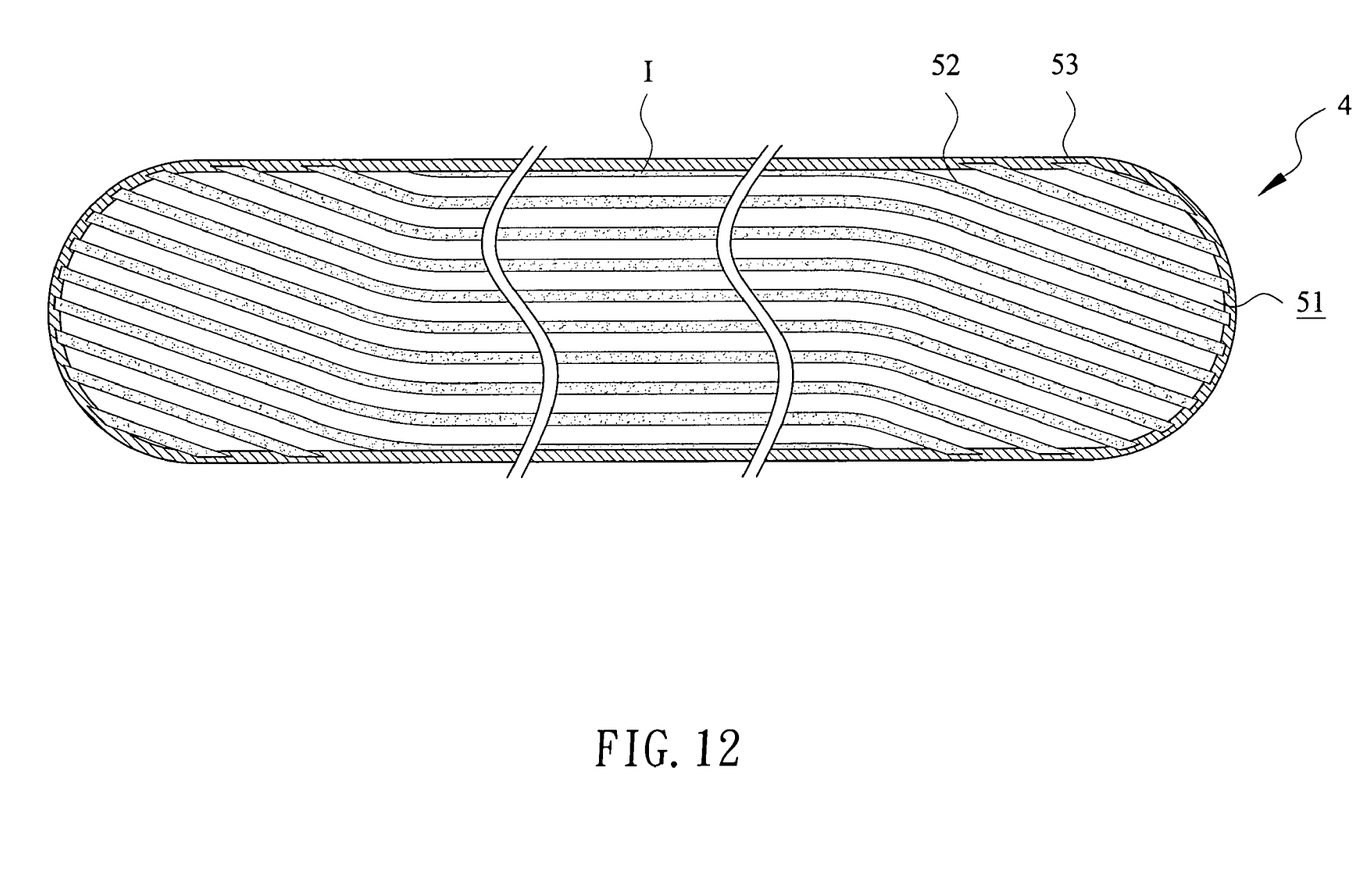
FIG. 12 is a cross-sectional view taken along line 12-12 of FIG. 11.
Figure 13:
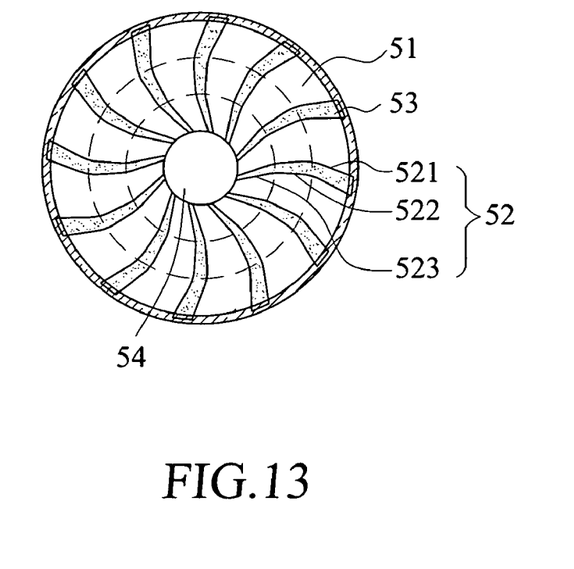
FIG. 13 is a cross-sectional view taken along line 13-13 of FIG. 11.

With reference now to FIGS. 11-13, which show, respectively, a schematic view of a heat pipe constructed in accordance with the present invention, and cross-sectional views taken along line 12-13 and 13-13 of FIG. 11, a heat pipe constructed in accordance with another embodiment of the present invention, generally designated with reference numeral 5, comprises an inner wall 51 in which a plurality of internal grooves 52, which are distributed in a circumferential direction, is defined. Each internal groove 52 has a first non-axially-extending parallel segment 521, an axially-extending parallel segment 522, and a second non-axially-extending parallel segment 523. The axially-extending parallel segment 522 are arranged to extend in an axial direction I of the heat pipe 5 and substantially parallel to each other. The first and second non-axially-extending parallel segments 521, 523 extend from opposite ends of the axially-extending parallel segment 522 in angles with respect to the axial direction I so as to form a non-axially-extending parallel configuration. All the internal grooves 52 accommodate a working fluid 53. A central channel 54 is formed inside the heat pipe 5 and surrounded by the inner wall 51.

Figure 14:
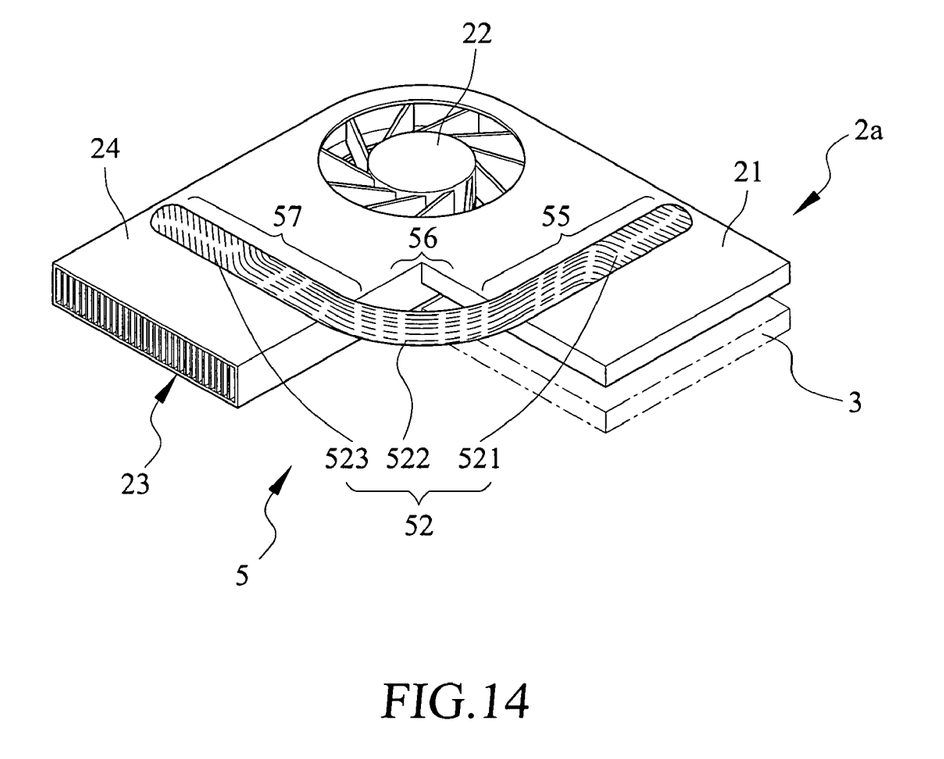
FIG. 14 is a perspective view showing the heat pipe of the present invention incorporated in a heat dissipation module.

Also referring to FIG. 14, which shows a perspective view of a heat dissipation module, also designated with reference numeral 2a, to which a heat pipe 5 in accordance with the present invention is attached, when attached to the heat dissipation module 2a, the heat pipe 5 can be imaginarily divided into a heat receiving section 55, a heat transfer section 56, and a heat dissipation section 57. A difference between the heat dissipation module 2a and the conventional heat dissipation module 2 shown in FIGS. 4 and 5 is that the heat conduction case 21 and the heat dissipation case 24 of the heat dissipation module 2a form respectively a heat-receiving-section receiving slot 25 and a heat-dissipation-section receiving slot 26. A major difference between the heat pipe 5 in accordance with the present invention and the conventional heat pipe resides in that the internal grooves 52 of the heat pipe 5 of the present invention is comprised of a first non-axially-extending parallel segment 521 located in the heat receiving section 55, an axially-extending parallel segment 522 located in the heat transfer section 56, and a second non-axially-extending parallel segment 523 located in the heat dissipation section 57. And the heat receiving section 55 is received, at least partly, in the heat-receiving-section receiving slot 25, while the heat dissipation section 57 is at least partly received in the heat-dissipation-section receiving slot 26.

Since the first non-axially-extending parallel segment 521 is located in the heat receiving section 55 of the heat pipe 5, in the heat receiving section 55, the working fluid 53 inside the angled, non-axially-extending parallel segments 521 of the internal grooves 52 is subject to uniform heating from a heat generating device 3. The working fluid 53 thus evaporates and turns into gas that flows through the central channel 54 toward the heat dissipation section 57 where heat exchange occurs between the working fluid 53 and the fin assembly 23 through the inner wall 51 of the heat pipe 5 and the heat dissipation case 24. With the heat exchange, the gaseous working fluid 53 condenses and turns back to liquid.

Further, since the second non-axially-extending parallel segment 523 is located in the heat dissipation section 57 of the heat pipe 5, in the heat dissipation section 57, the working fluid 53 inside the angled, non-axially-extending parallel segments 523 of the internal grooves 52 is subject to uniform cooling due to heat exchange with the fin assembly 23 and condenses back to liquid for flowing through axially-extending parallel segment 522 of the internal groove 52 back to the heat receiving section.

Since the axially-extending parallel segments 522 of the internal grooves 52 are located in the heat transfer section 56 of the heat pipe 5, the axially-extending parallel segments 522 form the shortest flowing path for the working fluid 53 within the heat transfer section 56, which allows the working fluid that condenses in the second non-axially-extending parallel segment 523 to flow from the heat dissipation section 57 back to the heat receiving section 55 in the most efficient manner.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A heat pipe, comprising:
    a heat receiving section;
    a heat transfer section;
    a heat dissipation section coupled to the heat receiving section through the heat transfer section, the heat transfer section is disposed between the heat receiving section and the heat dissipation section; and
    a groove structure formed in an inner wall of the heat pipe and extending from the heat receiving section through the heat transfer section to the heat dissipation section, provided with at least an axially-extending parallel portion and a non-axially-extending parallel portion;

wherein the axially-extending parallel portion comprises a plurality of first groove segments extending parallel in an axial direction of the heat pipe and the non-axially-extending parallel portion comprises a plurality of second groove segments corresponding to, respectively connected to and extending from the first groove segments in a parallel manner in a direction different from the axial direction of the heat pipe, forming continuous grooves extending from one end to another end of the heat pipe, where the entire heat pipe is devoid from any intersecting groove segments, whereby the non axial-extending parallel position is subject to substantially uniform heating from the heat receiving section for increased heat transfer between the ends of the heat pipe.

2. The heat pipe as claimed in claim 1, wherein the groove segments of the non-axially-extending parallel portion are formed in the inner wall within the heat receiving section of the heat pipe.

3. The heat pipe as claimed in claim 1, wherein the groove segments of the non-axially-extending parallel portion are formed in the inner wall within the heat dissipation section of the heat pipe.

4. The heat pipe as claimed in claim 1, wherein the heat dissipation section of the heat pipe forms a plurality of non-axially-extending parallel groove segment in the inner wall, and wherein the heat receiving section of the heat pipe forms a plurality of non-axially-extending parallel groove segment in the inner wall, and wherein the heat transfer section of the heat pipe forms a plurality of axially-extending parallel groove segment in the inner wall, the non-axially-extending parallel groove segments of the heat dissipation section being connected to and in fluid communication with the non-axially-extending parallel groove segments of the heat receiving section through the axially-extending parallel groove segments.

5. A heat dissipation module adapted to be positionable in physical engagement with a heat source device, comprising:
a heat conduction case;
a fin assembly; and
a heat pipe comprising a heat receiving section, a heat transfer section, and a heat dissipation section coupled to the heat receiving section through the heat transfer section, the heat receiving section and the heat dissipation section being in physical engagement with the heat conduction case and the fin assembly respectively, the heat transfer section is disposed between the heat receiving section and the heat dissipation section, a groove structure formed in the heat pipe and extending from the heat receiving section to the heat dissipation section, the groove structure being provided with at least an axially-extending parallel portion and a non-axially-extending parallel portion;

wherein the axially-extending parallel portion comprises a plurality of first groove segments extending parallel in an axial direction of the heat pipe and the non-axially-extending parallel portion comprises a plurality of second groove segments extending from the first groove segments in a parallel manner in a direction different from the axial direction of the heat pipe, forming continuous grooves extending from one end to another end of the heat pipe, where the entire heat pipe is devoid from any intersecting groove segments, whereby the non axial-extending parallel position is subject to substantially uniform heating from the heat receiving section for increased heat transfer between the ends of the heat pipe.

6. The heat dissipation module as claimed in claim 5, wherein the axially-extending parallel portion is formed in the inner wall of the heat transfer section of the heat pipe.

7. The heat dissipation module as claimed in claim 6, where the non-axially-extending parallel portion is formed in the inner wall within the heat receiving section of the heat pipe.

8. The heat dissipation module as claimed in claim 7, wherein the axially-extending parallel portion is formed in the inner wall within the heat dissipation section of the heat pipe.

9. The heat dissipation module as claimed in claim 7, wherein the non-axially-extending parallel portion is formed in the inner wall within the heat dissipation section of the heat pipe.

10. The heat dissipation module as claimed in claim 5 further comprising a fan arranged between the heat conduction case and the fin assembly.

11. The heat dissipation module as claimed in claim 5, wherein the heat conduction case and the fin assembly forms a heat-receiving-section receiving slot and a heat-dissipation-section receiving slot, respectively, to at least partly receive the heat receiving section and the heat dissipation section of the heat pipe.

* * * * *